(12) United States Patent
Hache et al.

(10) Patent No.: US 8,000,171 B2
(45) Date of Patent: Aug. 16, 2011

(54) SEISMIC SENSOR HOUSING

(75) Inventors: Jean-Michel Hache, Bourg la Reine (FR); Harvey Ray Grimes, Slependen (NO); Gunnar A. Lindeman, Haslum (NO); Jon Mangus Soerli, Svelvik (NO); Kenneth Pedersen, Oslo (NO); Anders Falke Roeraas, Elksmarka (NO); Roar Stenhaug, Asker (NO); Raymond R. Ness, Jr., Anchorage, AK (US); Francis Maissant, Oslo (NO)

(73) Assignee: WesternGeco L.L.C., Houston, TX (US)

( * ) Notice: Subject to any disclaimer, the term of this patent is extended or adjusted under 35 U.S.C. 154(b) by 358 days.

(21) Appl. No.: 12/180,954

(22) Filed: Jul. 28, 2008

(65) Prior Publication Data
US 2010/0020647 A1 Jan. 28, 2010

(51) Int. Cl.
*G01V 1/16* (2006.01)
(52) U.S. Cl. .......................................... 367/188
(58) Field of Classification Search .................. 367/188, 367/177, 87
See application file for complete search history.

(56) References Cited

U.S. PATENT DOCUMENTS

| | | | | |
|---|---|---|---|---|
| 2,908,890 A * | 10/1959 | Campbell et al. | ............. | 367/188 |
| 3,930,218 A * | 12/1975 | Hall, Jr. | ......................... | 367/188 |
| 3,993,859 A | 11/1976 | McNeel | | |
| 4,117,449 A | 9/1978 | McNeel | | |
| 4,122,433 A * | 10/1978 | McNeel | ......................... | 367/188 |
| 4,809,245 A * | 2/1989 | Woodall et al. | ................ | 367/188 |
| 2010/0020647 A1* | 1/2010 | Hache et al. | ................... | 367/188 |

FOREIGN PATENT DOCUMENTS

| WO | 02/14905 A1 | | 2/2002 |
|---|---|---|---|
| WO | WO 2010/014414 | * | 2/2010 |

OTHER PUBLICATIONS

Sensor Nederland B. V., PE-3/D Land Case—Equipment Built for Seismic Front Line, Input-Output Inc, 2006.
International Search Report and Written Opinion; Appl. No. PCT/US2009/050785; dated Feb. 2, 2010.

* cited by examiner

*Primary Examiner* — Dan Pihulic

(57) ABSTRACT

An example of a cable positioning mechanism for directing a cable into a seismic sensor housing for connection with the seismic sensor includes a member sized to connect with a seismic sensor housing, the cable passing through the member at opposing anchor points for operational connection to the seismic sensor between the anchor points, wherein the cable is oriented through the member at an angle that is not perpendicular to a vertical axis of the sensor housing.

20 Claims, 2 Drawing Sheets

SEISMIC SENSOR HOUSING

TECHNICAL FIELD

The present invention relates to housing assemblies for seismic sensors or detectors.

BACKGROUND

Land based seismic operations commonly use seismic detectors, referred to as geophones. The geophones are contained within housings. The housing protects the geophone and the geophone-cable connection from water and also provides physical protection to the geophone. Geophone housings also must provide entry to the geophone by the cable. The housings must also be adapted for the environment in which the geophone is to be utilized. For example, in many conditions the geophone must provide a low-profile to reduce wind noise during operation of the system. However, in other environments such as deep snow, transition zones, and swamps it is necessary to plant the geophone assembly deep thus needing for the cables to be oriented upward. To meet the needs of the various geographical and environmental conditions, separate inventories of seismic equipment are commonly maintained.

SUMMARY

An example of a seismic sensor housing includes a body disposing a seismic sensor; a coupling mechanism positioned at one side of the body and in operational connection with the sensor; a vertical axis extending through the body and the coupling mechanism; a cable electrically connected to the sensor; and a positioning member connected to the body on a side opposite from the coupling mechanism, the positioning member passing the cable through an entry point orienting the cable into the body at an angle that is not perpendicular to the vertical axis.

An example of a cable positioning mechanism for directing a cable into a seismic sensor housing for connection with the seismic sensor includes a member sized to connect with a seismic sensor housing, the cable passing through the member at opposing anchor points for operational connection to the seismic sensor between the anchor points, wherein the cable is oriented through the member at an angle that is not perpendicular to a vertical axis of the sensor housing.

An example of a method for operationally connecting a cable to a seismic sensor includes the steps of providing a body carrying a seismic sensor, a coupling mechanism positioned at one side of the body in operational connection with the sensor, and a vertical axis extending through the body and the coupling mechanism; and directing the cable into the body at an angle that is not perpendicular to the vertical axis or parallel to the vertical axis.

The foregoing has outlined some of the features and technical advantages of the present invention in order that the detailed description of the invention that follows may be better understood. Additional features and advantages of the invention will be described hereinafter which form the subject of the claims of the invention.

BRIEF DESCRIPTION OF THE DRAWINGS

The foregoing and other features and aspects of the present invention will be best understood with reference to the following detailed description of a specific embodiment of the invention, when read in conjunction with the accompanying drawings, wherein.

DETAILED DESCRIPTION

Figure 1:
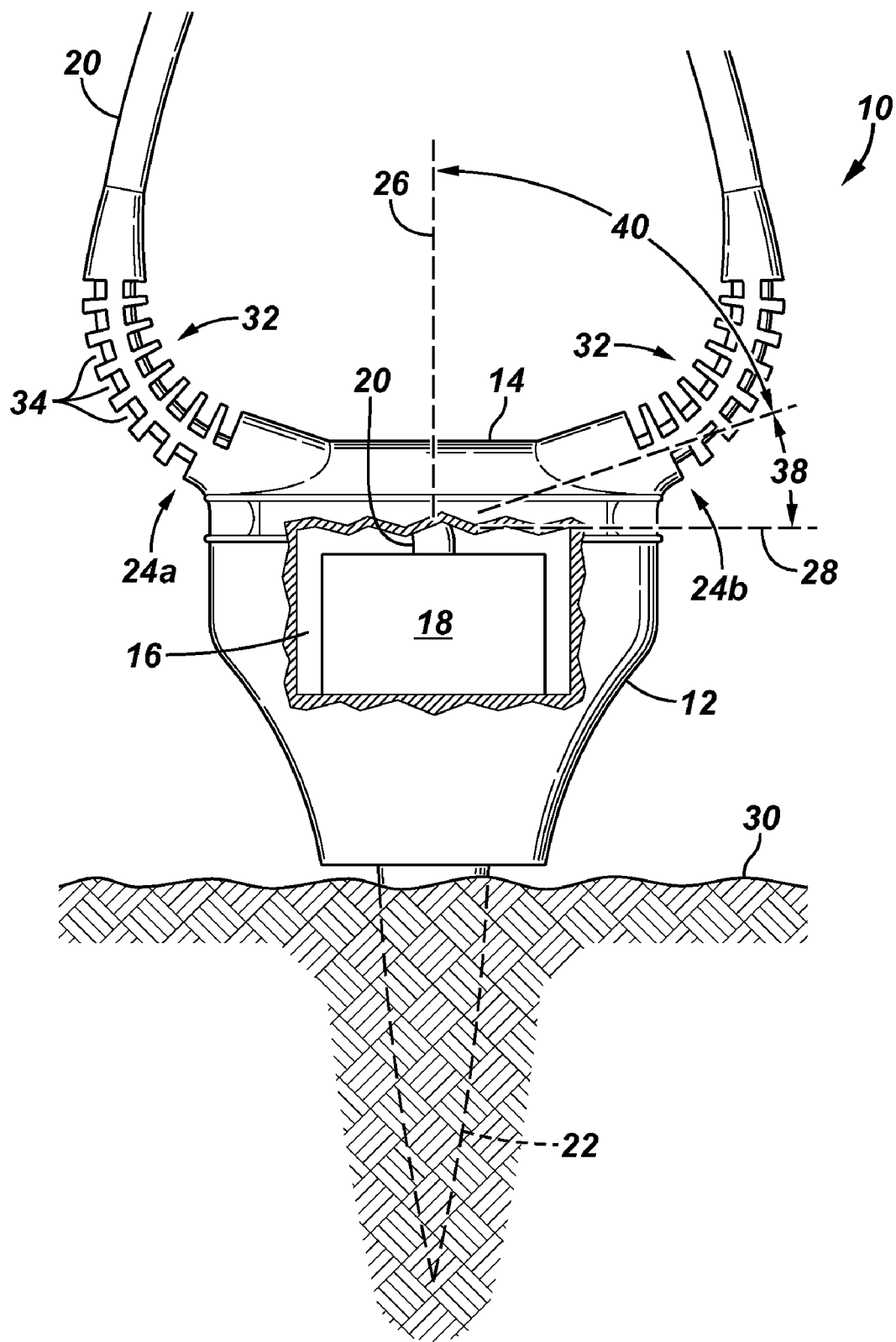
FIG. 1 is a conceptual, partial cut-away elevation view of an example of a seismic sensor housing of the present invention.

Refer now to the drawings wherein depicted elements are not necessarily shown to scale and wherein like or similar elements are designated by the same reference numeral through the several views.

Environmental conditions and geographic regions dictate desirable features and profiles of sensor housings. For example, low-profile sensor housings with the cable maintained relatively horizontal or parallel to ground level are desired in regions such as the arctic tundra, desert, mountains, and plains to reduce wind noise. In deep snow, swamps, and transition zones and the like it is desired to plant the housing and sensor deep in the snow, water or mud. In these conditions, it is a benefit to have the cables extending upward along a vertical axis to maintain coupling with the ground and to facilitate the use of planting tools.

FIG. 1 is a perspective view of an example of a seismic sensor housing assembly of the present invention, generally denoted by the numeral 10. Housing assembly 10 is adapted for deployment of the contained seismic sensor in a variety of diverse environments. Housing assembly 10 includes a body 12 and a cable positioning member 14. Body 12 has an interior cavity 16 that holds a seismic sensor 18, referred to herein as a geophone. A coupling mechanism 22, such as a spike or base, is in operational connection with geophone 18 for providing a means to seismically connect the geophone and earth. Coupling mechanism 22 is positioned at the bottom of body 12. Cable 20 is electrically connected to geophone 18. Positioning member 14 is positioned at the open top of body 12 and directs cable 20 into body 12.

The illustrated sensor housing assemblies 10 have a longitudinal or vertical axis 26 that is identified as the axis extending through coupling member 22 and into the earth when placed. Horizontal axis 28 is substantially perpendicular to vertical axis 26 and may be substantially parallel to the ground surface 30. In the illustrated examples, a vertical plane is the plane substantially parallel to vertical axis 26.

Cable positioning member 14 may be integrally connected with cable 20 and is securable with body 12. Positioning member 14 provides cable entry and anchor points 24, identified on opposing sides as points 24a and 24b. Points 24 identify the cable entry into the assembled housing for operational connection with sensor 18. In the illustrated examples, cable 20 is oriented at point 24 at an angle 38 offset from horizontal axis 28 and at an angle 40 offset from vertical axis 26. This orientation of the entry of cable 20 at points 24 is counter to the traditional sensors and sensor housings.

Cable 10 is functionally and operationally connected to body 12 in a manner to facilitate the use of housing 10 and sensor 18 in diverse environments. For example, cable 20 is connected to body 12 through member 14 in a manner such that it is moveable within a vertical plane. Further, cable 20 is oriented relative to housing assembly 10 in a manner to provide a low-profile configuration, such as in FIG. 2, and also allow for utilizing a planting tool and maintaining seismic coupling with the earth when cable 20 is oriented substantially parallel to vertical axis 26 as illustrated in FIG. 1. For example, housing assembly 10 is illustrated with cables 20 pivoting upward in the vertical plane away from ground 30 in FIG. 1. Cables 20 pivot upward at anchor points 24. The upward orientation of cables 20 may be provided by tension applied during planting into ground 30 or may be maintained by material such as snow or mud that surrounds the planted sensor and housing.

In the illustrated examples, cable 20 and positioning member 14 are physically connected to one another at point 24 so that tension on cable 20 is applied to positioning member 14 and not to the connection between cable 20 and sensor 18.

Cable positioning member 14 may further include flexing section 32 further facilitating movement of cable 20 in the vertical direction while urging cable 20 to a base position. Flexing section 32 may be a sleeve member connected to cable 20 proximate to positioning member 14, a portion of cable 20, or may be an integral portion of member 14 and cable 20. For example, in FIG. 1, flexing section 32 is integrally formed with cable 20 and positioning member 14. Flexing section 32 includes valleys 34 formed on opposing sides of cable 20 along the vertical axis such that flexing of cable 20 is promoted along the vertical plane.

Figure 2:
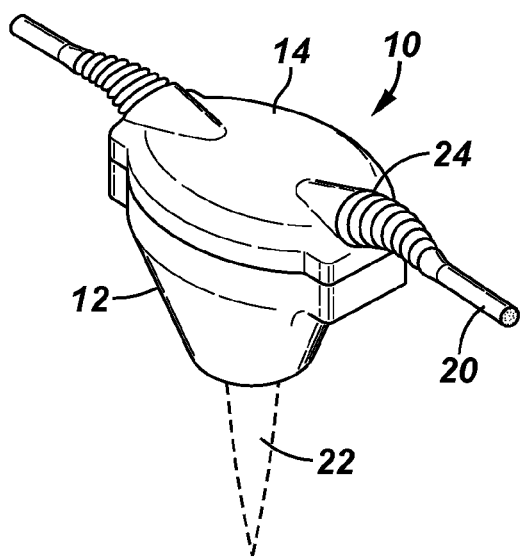
FIG. 2 is a perspective view of an example of a seismic sensor housing in the low-profile position.

Refer now to FIG. 2 wherein another example of a housing assembly 10 of the present invention is illustrated. In this example, cable 20 is shown in a low profile position wherein cable 20 extends substantially parallel to horizontal axis 28 (FIG. 1) after extending outward at anchor and cable entry point 24 at angle 38 offset from horizontal axis 28. In this position, housing assembly 10 provides a low profile and limits wind noise. In this example, the low profile is the original or relaxed position for cables 20. It is also noted that in the example illustrated in FIG. 2 that cable positioning member 14 also serves as the cap that sealingly encloses the geophone in the housing.

Figure 3:
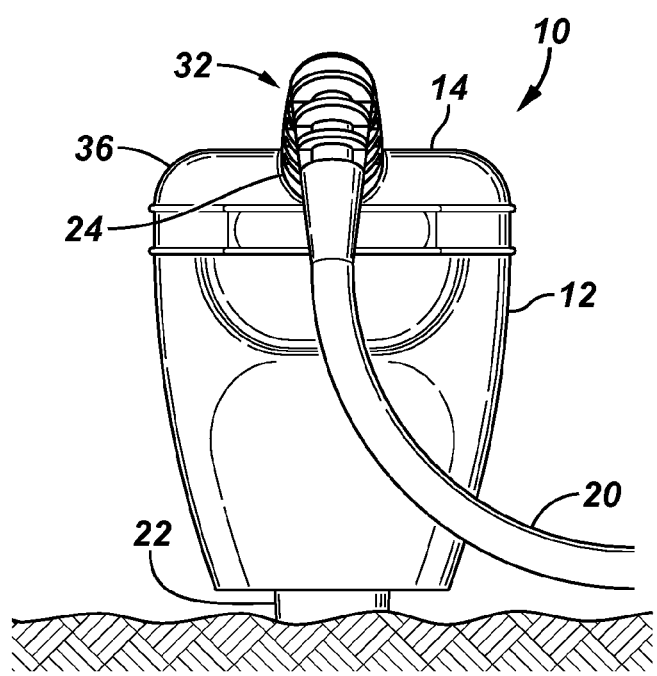
FIG. 3 is a perspective view from the side of an example of a seismic sensor housing of the present invention.

FIG. 3 is a perspective view of another example of a seismic sensor housing 10 of the present invention. Housing assembly 10 is shown in the low-profile, or relaxed position, wherein cable 20 extends substantially parallel out of housing 10. In this example, positioning member 14 is shown in addition to a cap 36. In other words, positioning member 14 is positioned in functional connection with cap 36 to enclose the geophone within body 12.

Figure 4:
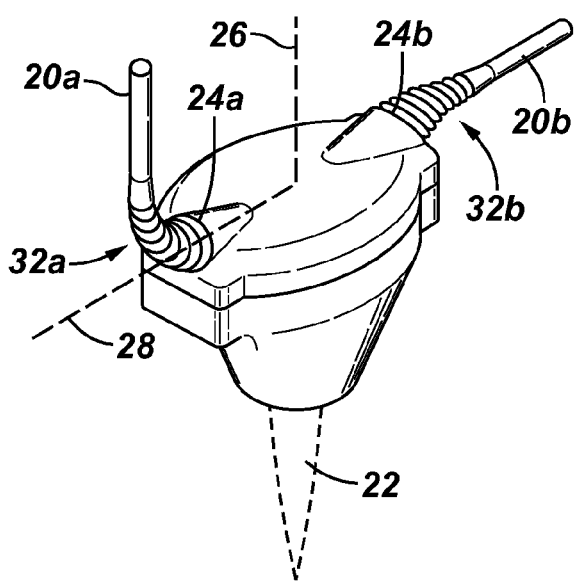
FIG. 4 is a perspective view of another example of seismic sensor of the present invention.

Refer now to FIG. 4 illustrating another example of seismic sensor housing assembly 10. In this illustration the elements on the left side of the housing 10 are designated with subscripts "a" and the elements on the right side of housing 10 are designated by the subscript "b". The left side illustrates cable 20a extended upward in the vertical plane and the right side illustrates cable 20b in the low-profile position. The resting position is in the illustrated examples is the low profile position.

From the foregoing detailed description of specific embodiments of the invention, it should be apparent that a seismic sensor housing that is novel has been disclosed. Although specific embodiments of the invention have been disclosed herein in some detail, this has been done solely for the purposes of describing various features and aspects of the invention, and is not intended to be limiting with respect to the scope of the invention. It is contemplated that various substitutions, alterations, and/or modifications, including but not limited to those implementation variations which may have been suggested herein, may be made to the disclosed embodiments without departing from the spirit and scope of the invention as defined by the appended claims which follow.

What is claimed is:

1. A seismic sensor housing, the housing comprising:
 a body disposing a seismic sensor;
 a coupling mechanism positioned at a bottom side of the body and in operational connection with the seismic sensor, a vertical axis extending through the body and the coupling mechanism, and a horizontal axis extending perpendicular to the vertical axis;
 a cable electrically connected to the seismic sensor; and
 a positioning member connected to the body on a top side opposite from the coupling mechanism, the vertical axis extending through the positioning member, wherein the positioning member passes the cable through an entry point orienting the cable to extend away from the body at an angle that is offset from the vertical axis and oriented upward relative to the coupling mechanism and the horizontal axis.

2. The housing of claim 1, wherein the cable is physically connected to the positioning member at the entry point.

3. The housing of claim 1, wherein the cable and the positioning member are integrally formed.

4. The housing of claim 1, wherein the positioning member forms a cap sealingly enclosing the seismic sensor in the body.

5. The housing of claim 1, wherein the positioning member is in connection with a cap member that is connected to the body.

6. The housing of claim 1, wherein the positioning member facilitates movement of the cable along a plane substantially parallel to the vertical axis.

7. The housing of claim 1, further including a flexing section in connection between the cable and the positioning member proximate to the entry point.

8. The housing of claim 7, wherein the flexing section includes members enhancing pivoting of the cable proximate to the entry point in a plane substantially parallel to the vertical axis.

9. A cable positioning mechanism for directing a cable into a seismic sensor housing for connection with the seismic sensor, the mechanism comprising:
 a member sized to connect with a seismic sensor housing having a coupling mechanism positioned at a bottom side of the seismic sensor housing, a vertical axis extending through the coupling mechanism, and a horizontal axis extending perpendicular to the vertical axis; and
 the member comprising opposing anchor points to pass the cable into the housing for operational connection to the seismic sensor between the anchor points, wherein the anchor points orient the cable to extend away from the seismic sensor housing at an upward angle relative to the coupling mechanism and the horizontal axis.

10. The cable positioning mechanism of claim 9, wherein the cable is oriented through the member at an angle offset from the vertical axis.

11. The cable positioning mechanism of claim 9, wherein the cable and the member are integrally formed.

12. The cable positioning mechanism of claim 9, wherein the cable is physically connected to the member proximate to each of the opposing anchor points to transfer tension in the cable to the member and the seismic sensor housing.

13. The cable positioning mechanism of claim 9, further including a flexing section formed along the cable proximate to each of the opposing anchor points, the flexing section promoting movement of the cable in a plane parallel to the vertical axis.

14. A method for operationally connecting a cable to a seismic sensor, comprising:
   providing a body carrying a seismic sensor, a coupling mechanism positioned at a bottom side of the body in operational connection with the sensor, a vertical axis extending through the body and the coupling mechanism, and a horizontal axis extending perpendicular to the vertical axis; and
   directing the cable into the body through an entry point; and
   orienting the cable at the entry point at an angle offset from the vertical axis and extending upward relative to the coupling mechanism and the horizontal axis.

15. The method of claim 14, further comprising connecting a positioning member, forming the entry point, to the housing opposite from the coupling mechanism, wherein the vertical axis extends through the positioning member and wherein the cable is integrally directed into the body by the positioning member.

16. The method of claim 15, further including a flexing section formed along the cable proximate to the positioning mechanism promoting movement of the cable in a plane substantially parallel to the vertical axis.

17. A cable positioning mechanism for directing a cable into a seismic sensor housing for connection with the seismic sensor, the mechanism comprising:
   a member sized to connect with a seismic sensor housing having a coupling mechanism positioned at a bottom side of the seismic sensor housing, a vertical axis extending through the coupling mechanism, and a horizontal axis extending perpendicular to the vertical axis; and
   the member comprising opposing anchor points to pass the cable into the housing for operational connection to the seismic sensor between the anchor points, wherein the anchor points orient the cable to extend away from the seismic sensor housing at an angle that is offset from the vertical axis and oriented upward relative to the seismic sensor housing and the horizontal axis.

18. The cable positioning mechanism of claim 17, wherein the cable and the member are integrally formed.

19. The cable positioning mechanism of claim 17, wherein the cable is physically connected to the member proximate to each of the opposing anchor points to transfer tension in the cable to the member and the seismic sensor housing.

20. The cable positioning mechanism of claim 17, further including a flexing section formed along the cable proximate to each of the opposing anchor points, the flexing section promoting movement of the cable in a plane parallel to the vertical axis.

* * * * *